Patented July 10, 1928.

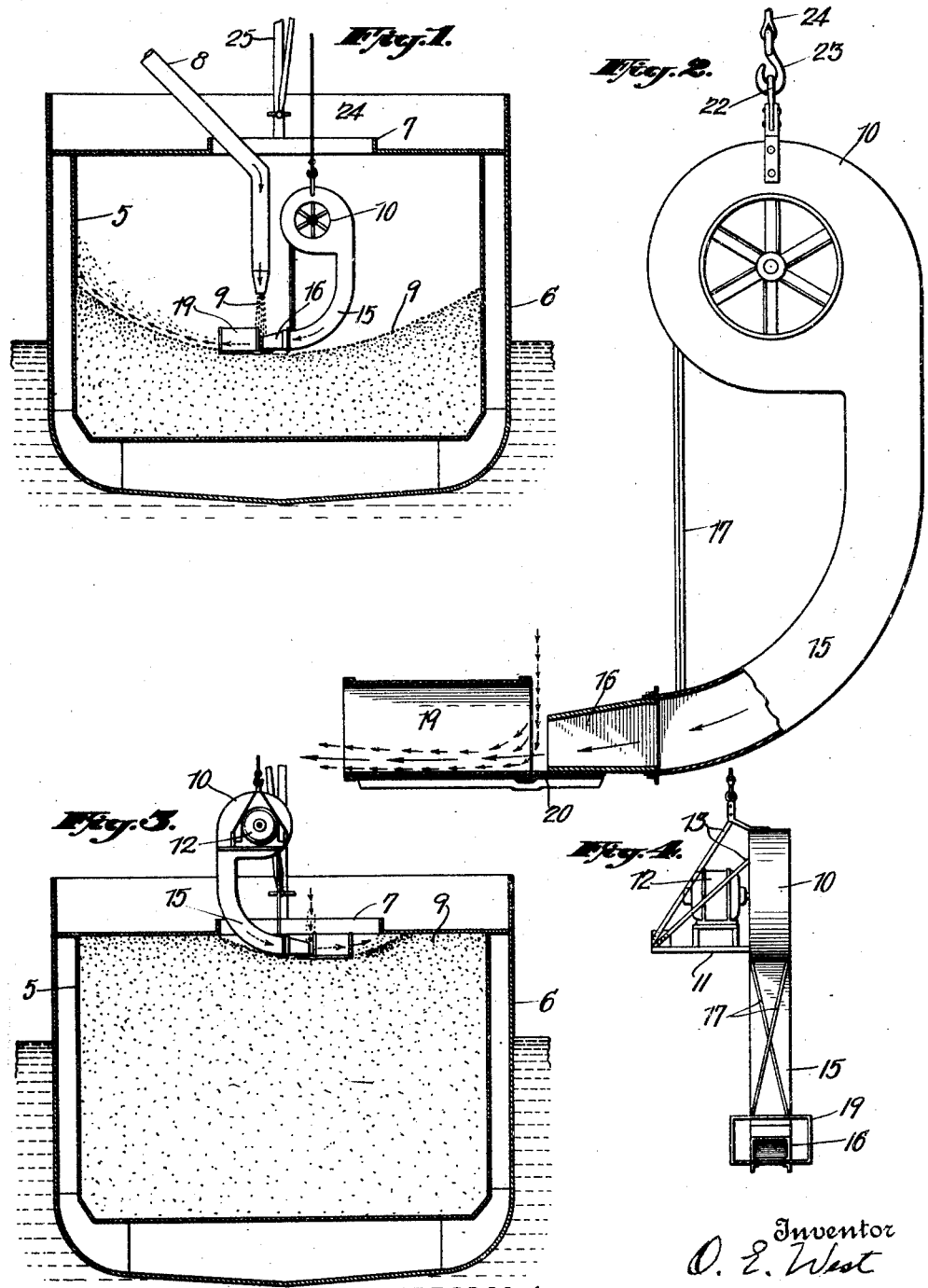

1,676,757

UNITED STATES PATENT OFFICE.

OSCAR E. WEST, OF NEW ORLEANS, LOUISIANA.

APPARATUS FOR TRIMMING GRAIN.

Application filed May 21, 1927. Serial No. 193,138.

This invention relates to apparatus for trimming grain in the holds of vessels or in other places.

Various devices have been suggested and tried for trimming grain in the holds of vessels, but such devices have been found to be more or less objectionable and inefficient for various reasons, and most of the grain trimming in vessels is still done by hand labor. The present inventor has experimented with various forms of apparatus for this purpose for many years, and has invented certain forms of apparatus as is shown by his United States Letters Patent Nos. 1,524,070, January 27, 1925, and 1,145,952, July 13, 1915. None of the devices of these patents has proven entirely satisfactory in operation for various reasons; but the apparatus which forms the subject of the present invention has been tested and found to be efficient and practical for the trimming of grain under the conditions usually existing in grain carrying vessels. Said apparatus is adapted to be lowered through a hatch into the hold of a vessel, and can readily be manipulated therein so as to project grain flowing from a chute down through the hatch, to the parts of the hold distant from the spot directly below the hatch. As the hold is filled, the device may readily be raised and manipulated, and will continue to project the grain in the desired directions until the hold is filled.

The invention will be understood from the following description, taken in connection with the accompanying drawings, in which Figure 1 is a side elevation of the apparatus shown as lowered into the hold of a vessel which is being loaded with grain; Figure 2 is an enlarged view of the apparatus partly in elevation and partly in section; Figure 3 is a view similar to Figure 1, but showing the hold of the vessel substantially filled with grain; and Figure 4 is a view in elevation of the apparatus as seen from the left in Figure 2.

Referring to the drawings, the apparatus embodying the invention is therein shown as used in the loading of grain into the hold 5 of a vessel 6. The apparatus is lowered through the hatch 7 into the hold, and is therein manually positioned in a proper relation to a grain chute 8, so as to receive the grain 9 as it is introduced into the vessel and project the grain to the parts of the hold distant from the spot directly below the hatch.

The apparatus includes a suitable fan or blower 10, carrying at one side thereof a motor platform 11 upon which is mounted an electric motor 12, the platform 11 being suitably braced with respect to the fan 10 by angle-irons 13 or the like.

A suitable conduit 15 is connected to the fan 10 and extends downwardly on a curve, the lower end of the conduit 15 being connected to a horizontally directed nozzle 16. The upper wall of the nozzle 16 is preferably inclined downwardly at a slight angle so that the area of the nozzle at its outlet end is somewhat less than the cross-sectional area of the conduit 15. The lower end of the conduit 15 together with the nozzle 16 is suitably braced with respect to the fan 10 by angle-irons 17 or the like which are preferably arranged as shown in Figure 4.

A directing conduit 19 is arranged in front of the outlet end of the nozzle 16 in a spaced relation thereto. The cross-sectional area of this directing conduit 19 is somewhat larger than the cross-sectional area of the nozzle 16, and its lower side wall extends rearwardly and forms a plate 20 extending from the bottom of the nozzle 16 to the bottom of the directing conduit 19.

The unitary structure above described is provided with an eye 22 secured to the angle-irons 13, by which the whole apparatus may be suspended from a hook 23 attached to the end of a hoisting rope 24 of a derrick 25 which is herein only partially indicated, and may be operated in any suitable manner.

When used in the hold of a vessel, for example, the apparatus is lowered through the hatch-way to the bottom of the hold where it is held in an upright and suspended position by the hoisting rope 24, although the bottom of the nozzle 16 and the directing conduit 19 rests at first on the floor of the hold and later on the grain as the hold is filled. By manual manipulation, the space between the end of the nozzle 16 and the adjacent end of the directing conduit 19 is kept approximately beneath the end of the grain chute 8, so that a considerable portion of the grain entering the hold from that chute falls into the path of air passing from the nozzle 16 into and through the directing conduit 19. The grain so entrained in the air blast is projected from the directing conduit 19 to the distant parts of the hold. By manual manipulation the apparatus may be aimed in different directions so that the grain may be more or less evenly trimmed throughout the hold. As the hold fills, the apparatus is raised from time to time, until it finally reaches such a position as that shown in Figure 3 when the hold is substantially filled. The apparatus may then be hoisted by the derrick and is ready for use elsewhere.

It will be understood that changes and modifications may be made in the construction shown and above particularly described, without departing from the spirit of the invention as defined in the following claims.

What is claimed is:

1. A portable grain trimmer comprising in a unitary structure adapted to be suspended from a rope, a fan, an electric motor driving said fan, a conduit projecting downwardly from said fan and having a horizontally directed nozzle, and a directing conduit arranged in front of said nozzle in a spaced relation thereto, whereby grain will fall into the path of air passing from said nozzle into and through said directing conduit and will enter and be projected from the latter.

2. A portable grain trimmer comprising in a unitary structure adapted to be suspended from a rope, a fan, an electric motor driving said fan, a conduit projecting downwardly from said fan and having a horizontally directed nozzle, and a directing conduit having a cross-sectional area larger than the cross-sectional area of said nozzle and located in front of said nozzle in a spaced relation thereto, whereby grain will fall into the path of air passing from said nozzle into and through said directing conduit and will enter and be projected from the latter.

3. A portable grain trimmer comprising in a unitary structure adapted to be suspended from a rope, a fan, an electric motor driving said fan, a conduit projecting downwardly from said fan and having a horizontally directed nozzle, a directing conduit having a cross-sectional area larger than the cross-sectional area of said nozzle and located in front of said nozzle in a spaced relation thereto, and a plate extending from the bottom of said nozzle to the bottom of said directing conduit, whereby grain falling into the path of air passing from said nozzle over said plate and into and through said directing conduit will be supported by said plate and will enter and be projected through said directing conduit.

4. A portable grain trimmer comprising a fan, an electric motor driving said fan, a conduit projecting downwardly from said fan and having a horizontally directed nozzle, a directing conduit having a cross-sectional area larger than the cross-sectional area of said nozzle and located in front of said nozzle in a spaced relation thereto, and a plate extending from the bottom of said nozzle to the bottom of said directing conduit, whereby grain falling into the path of air passing from said nozzle over said plate and into and through said directing conduit will be supported by said plate and will enter and be projected through said directing conduit.

In testimony whereof, I have affixed my signature to this specification.

OSCAR E. WEST.